United States Patent [19]

Musmanno

[11] 4,346,442
[45] Aug. 24, 1982

[54] SECURITIES BROKERAGE-CASH MANAGEMENT SYSTEM

[75] Inventor: Thomas E. Musmanno, Brooklyn, N.Y.

[73] Assignee: Merrill Lynch, Pierce, Fenner & Smith Incorporated, New York, N.Y.

[21] Appl. No.: 173,331

[22] Filed: Jul. 29, 1980

[51] Int. Cl.³ .............................................. G06F 15/21
[52] U.S. Cl. ..................................... 364/408; 364/900
[58] Field of Search ................. 364/200, 300, 408, 900

[56] References Cited

U.S. PATENT DOCUMENTS 3,082,402  3/1963  Scantlin ........................... 364/408 X
4,194,242  3/1980  Robbins .............................. 364/200

OTHER PUBLICATIONS

CMA Money Trust-Prospectus, Aug. 25, 1978.
"Merrill Lynch Cash Management Account", Published Oct. 1978 by Merrill Lynch, Pierce, Fenner & Smith Inc.

Primary Examiner—Jerry Smith
Attorney, Agent, or Firm—J. Gibson Semmes; Joseph Shortill

[57] ABSTRACT

Data processing for an improved securities brokerage/-cash management system supervises, implements and coordinates a margin securities brokerage account; participation in one or more short term money market or comparable funds; and subscriber-initiated use of electronically responsive subscriber identity credit/debit media and/or checking systems. Subscriber expenditures, effected as by "charge card" use, check and/or cash advance are applied on a hierarchal basis, seriatim, against the subscriber's free credit balance, short term investment and the lendable equity in his securities account. On a periodic basis, e.g., daily, received card charges, check, securities and deposit transactions for the ensemble of account participants are verified and employed to compute an updated credit limit for each subscriber. The transactional data is reviewed against predetermined norms to detect abuses such as check kiting. The short term investment position of each account is modified as necessary to permit money market or comparable earned yields on the account free credit cash balance.

6 Claims, 4 Drawing Figures

SECURITIES BROKERAGE-CASH MANAGEMENT SYSTEM

DISCLOSURE OF THE INVENTION

This invention relates to financial business systems and, more specifically, to data processing methodology and apparatus for effecting an improved securities brokerage and cash management system.

It is an object of the present invention to provide an improved brokerage/cash management system.

More specifically, it is an object of the present invention to provide a data processing implementation for a brokerage-cash management financial system which provides for automatic investment of free credit cash balances in one or more of money market (short term) taxable or tax-favored funds; a full range of security brokerage transaction functions; which permits consumer transaction ("charge") card and check charges; and which includes safeguards against abuses, e.g., check kiting.

The above and other objects of the present invention are realized in specific illustrative improved securities brokerage/cash management system for supervising, integrating and coordinating a margin securities brokerage account; participations in one or more short term money market or comparable funds; and subscriber-initiated use of a transaction charge card and/or checks. Subscriber expenditures as by charge card use, check, and/or cash advance are applied on a structural, hierarchal basis against the subscriber's free credit cash balance, short term investment and his securities equity. On a periodic basis, e.g., daily, received card, check, securities and deposit transactions for the ensemble of account participants are verified and employed to compute an updated credit limit for each subscriber. The transactional data is reviewed against predetermined norms to note abuses such as check kiting. The short term investment trust position of each account is modified as necessary to permit money market dividends or comparable earned yield on the account free credit cash balance.

The foregoing and additional features and advantages of the instant invention will become more readily apparent from the following detailed description of a specific illustrative embodiment thereof, presented hereinbelow in conjunction with the accompanying drawing, in which:

Figure 1A:
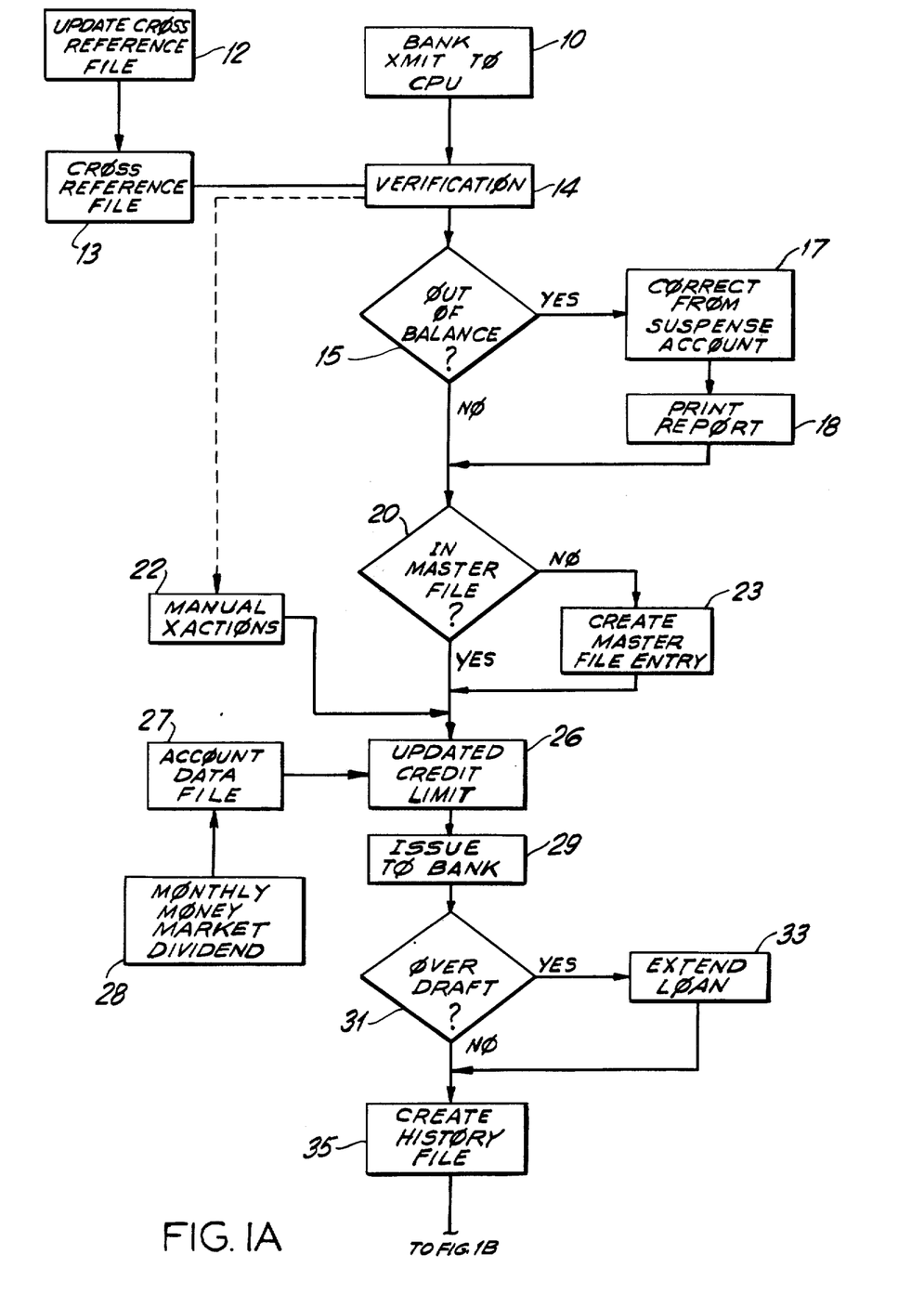
FIGS. 1A and 1B are respectively the upper and lower portions of a schematic flow chart depicting the data processing methodology and structure in accordance with the principles of the present invention for an improved brokerage/cash management system of accounts.
Figure 1B:
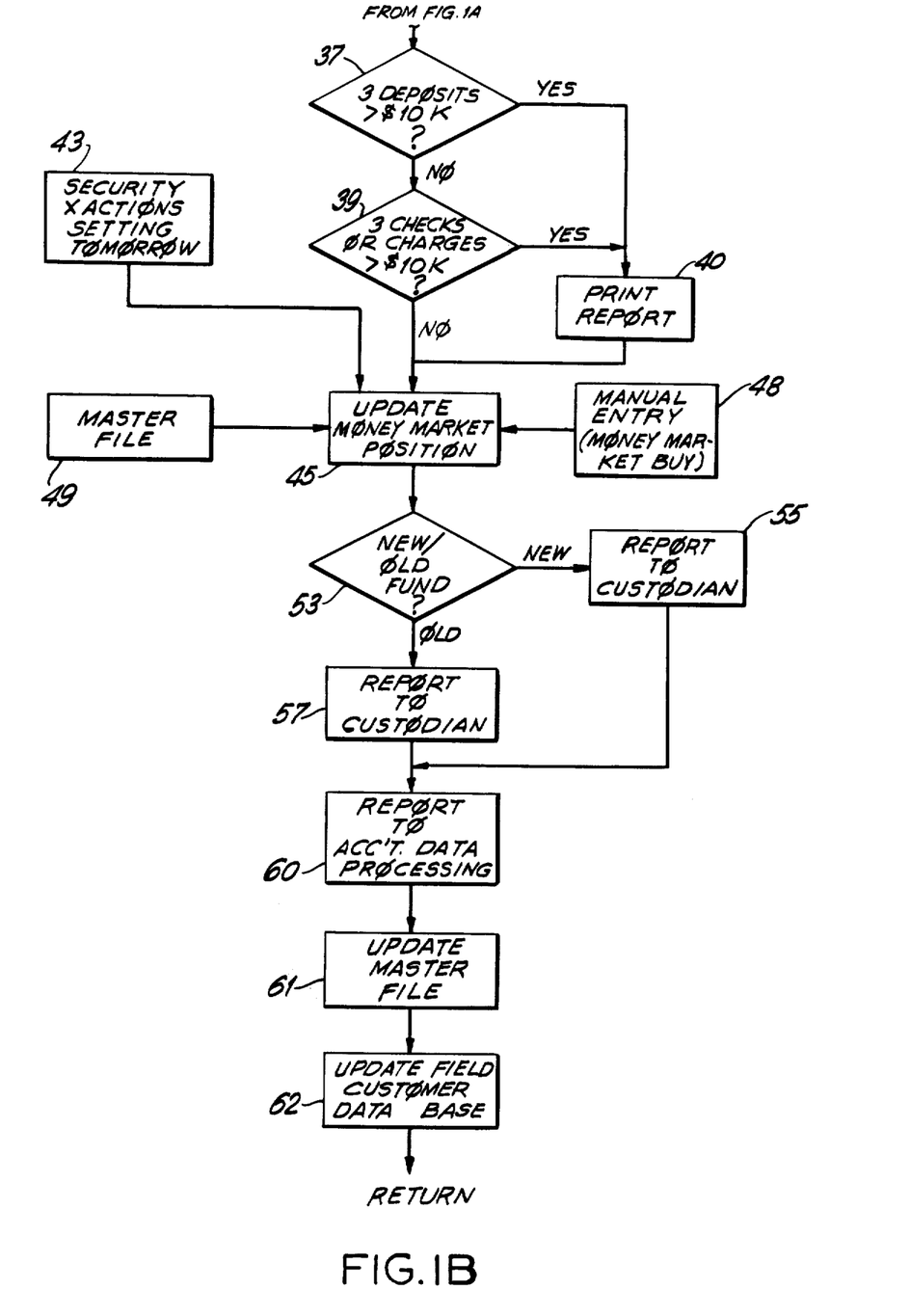

Referring now to FIG. 1, there is shown in overall scope a data processing and system operational flow chart for implementing an improved securities brokerage/cash management system incorporating the principles of the present invention. As contemplated by the present invention, there are three fundamental aspects of services offered to each of plural system subscriber.

At the kernel of the overall system is a margin brokerage account in which each customer may effect the usual diverse array of securities and related transactions—e.g., those offered by a full service brokerage house. As a second facet, there is at least one and in general a plurality of vehicles for short term investment of funds, e.g., pooled trusts. Each of these investment trusts, managed by a custodian with ancillary services possibly furnished by an investment advisor or the like, provides each system subscriber with one or more ways of earning yield on funds not then required for other purposes herein discussed. Such excess funds may be generated by subscriber deposits; by dividends or interest paid on securities in the subscriber's brokerage account; may represent proceeds of sale, securities redemption or like transactions in the brokerage account; or the like. The third and final aspect of the instant system arrangement comprises a transaction ("charge") card and a checking account. The transaction card is usable at the subscriber's sole discretion, under his control, to charge goods and services offered by those accepting the charge card. The charge card may be independent or may be affiliated with some charging system, e.g., the well known "VISA" charge system. The bank checks require no explanation and are simply payment orders drawn against the bank. They are not drawn against any repository if funds maintained at the bank. Rather, as below discussed, checks are satisfied from the subscriber's free credit balance, money market position or his securities margin account.

By way of brief overall philosophy, charges created by the transaction card and checks drawn against the bank are accumulated by the bank and transmitted to the brokerage house. The brokerage house establishes a credit limit against which each subscriber may use his transaction card and bank checks. The credit limit applicable to each subscriber is in the most fundamental of terms the value of the subscriber's free credit cash as represented by free cash in the brokerage account and by the subscriber's money market account(s) investment, plus the remaining loanable value of the subscriber's securities. A more precise statement of credit limit and the data processing methodology to determine same is set forth below. Any income or receipts for the subscriber's account, e.g., dividends, interest, sale or redemption proceeds from a securities account or the like, are applied to the overall subscriber's account in a predetermined, hierarchal manner to offer the subscriber either a maximized return or a minimum interest charge. In particular, any received or generated funds are first applied to reduce or eliminate any subscriber overdrafts. Following this, the funds or any remaining portion thereof reduce the subscriber's margin balance. Any excess as a general matter is then automatically invested for the subscriber in the one or more short term investment vehicles which the subscriber has selected or is entitled to pursue.

Correspondingly, when funds are required of the subscriber to satisfy any transaction or check charges or the like, they are obtained from the composite subscriber account in a hierarchal priority mode least negatively impacting the customer. Such funds exceeding yet uncommitted brokerage account cash are first obtained by free credit balances; thereafter by sale of the appropriate short term investments. Any excess requirement is then generated in the form of a margin loan against the subscriber's securities. Should this be insufficient, the overage takes the form of an overdraft loan by the bank to the subscriber subject to the bank's discretion and willingness to provide such an overdraft loan.

With the above overview in mind attention will now be directed to FIGS. 1A and 1B herein, referred to as composite FIG. 1, which is a schematic flow chart in overall scope of the data processing of the instant invention for effecting the above described operations. The functional blocks 26, 31, and 33, and 45 of FIG. 1 are expanded in the more detailed level flow charts of FIGS. 2 and 3 respectively.

Beginning at the top of FIG. 1, the bank first transmits to the brokerage central processing unit a record of all transactional information for each of the system subscribers, together with subscriber identification. Thus, each entry will include a subscriber identification, and transactional information such as a transaction card charge or credit (e.g., credit for returned charged merchandise) or a check identification and amount (functional block 10). A cross reference file 13 is maintained at the brokerage central processing unit of system subscribers, this being updated by manual or automatic entries 12. The incoming transactional information from the bank is verified at functional block 14. The verification assures (i) that the reported transaction is for a subscriber who is in fact known to and authorized by the system; and (ii) it verifies transmission and accuracy of the incoming information—e.g., by the per se well known system of verifying totals across batched lots of fixed, predetermined size of incoming transactional records.

Most typically, the verification will prove out ("NO" output) of "OUT-OF-BALANCE" test 15), and system flow passes to the next following test 20 to assure that the customer is identified in the master file which also will typically be a test that is satisfied ("YES" output of block 20). If, however, test 15 fails ("YES" output), the OUT-OF-BALANCE total is corrected from a suspense account (block 17), and a printed report of the discrepancy generated (function 18) before passing to the next following customer verification. Similarly, if test 20 fails, a proper identity is created in the Master File for the customer whose transaction is being processed, and system flow passes for succeeding operations. Finally for initializing processing, manual transaction entry 22 is employed to correct items needing manual intervention to account for errors, fraud items, stolen checks or the like.

Following such reception and verification of incoming items, the received transactional information is employed in functional block 26 to compute or update the then obtaining credit limit for each customer. As above noted, the functions performed by the block 26 are set forth in expanded detail in the flow chart of FIG. 2 discussed below. In brief terms at this point, it is the office of processing for block 26 to provide a credit limit computational variable CRDLT(I) which is the credit remaining available to each of the i customers or subscribers to the system. That is, CRDLT(I) is the amount of credit remaining to the I-indexed customer for use of his transaction card and checks. This credit limit CRDLT(I) is reported for each customer to the bank for purposes of honoring charges, checks, credit advances and the like. For convenience and conciseness of presentations, all indexed variables (such as CRDLT(I) above discussed) are shown without their index. It will readily be appreciated that all per-subscriber variables are in fact so indexed.

The functional block 26 is supplied with all customary brokerage data stored in a brokerage account data file 27. The particular ensemble of variables supplied to the credit limit computational processing 26 via file 27 are set forth in detail below in conjunction with the FIG. 2 expanded presentation of credit limit computation. In very brief terms, they include such as the short term (e.g., money market) investment position of each subscriber, the worth of his securities in the brokerage account, margin buying or loan power, and the like. The file 27 is as above noted maintained in the customary fashion in the brokerage house to reflect the customer's status. As one additional external entry (functional block 28), the short term investment interest earned for the customer is periodically (e.g., monthly) reported and reflected at the customer's storage in the account data file 27.

As part of credit limit updating, the customer's account is examined for an overdraft condition (test 31). Overdraft examination and processing is also set forth in detail in the FIG. 2 processing. If the customer has overdrawn his account, i.e., overdrawn his "credit limit", a temporary loan is extended to the customer (functional block 33). The customer is notified of the overdraft condition and required to clear the overdraft unless the bank is willing to extend a loan to the customer in a manner de hors his brokerage account and the FIG. 1 system.

Following functioning of the block credit limit and overdraft processing of steps 26, 31 and 33, the ensemble of credit limit variables CRDLT are supplied to the bank (function 29). This list of credit limits is employed at the bank to limit the credit available in its several forms to each of the subscribers, i.e., to limit the aggregate of usage of the customer charge card, checks and cash advances (via the card or check) which are supportable, from the customer's assets. As a further matter, and as part of the functioning block 26, the credit limit variable also updates each customer's record in the master file (operation 122, FIG. 2).

A history file or stored record is kept of the customer's transactions (block 35) for various purposes, including preserving data to generate periodic monthly statements. Following this, tests 37 and 39 operate on the historical transactional data for the customer to flag possible system abuses, e.g., check "kiting" where deposits are made to obtain money market interest, and the deposited proceeds withdrawn to cover the initial check before it clears. To uncover and prevent repetitive such abuses and others, the tests 37 and 39 respectively determine whether or not three substantial deposits (test 37) or withdrawals (test 39—e.g., card charges, cash advances or checks) exceeding some predetermined threshold such as $10,000 have occurred within a predetermined time period such as one month. If either of the tests 37 or 39 is answered in the affirmative, an output report is printed 40 to signal the incidence as a matter for investigation. Thus, for example, a dump of the entire account history might take place for evaluation.

The overall program flow next passes to the key operation 45 to selectively update the money market position (increment or decrement) depending upon whether excess cash has been generated by subscriber transactions and should be placed for investment; or whether cash is required for varying purposes. Again, detailed processing for the functional routine 45 is set forth in FIG. 3, which will be described in detail hereinbelow. Accordingly, functioning for the block 45 is discussed only briefly at this point in overview. The processing 45 is supplied with several variables such as manual entries 48 which might reflect monetary deposits by the customer with money market buy instructions; is supplied with master file information for all customers at block 49; and is finally supplied with information at block 43 reflecting security transactions (e.g., as part of the per se normal brokerage account data file). The output of update money market position processing 45 are a buy vis-a-vis sell variable for each account, together with the amount to be bought and sold. In the above discussion, a money market fund has been generically referred to in the singular as the short term investment for the subscriber. In fact, each subscriber can participate in several such short term investments, e.g., standard taxable money market funds, a so-called clone fund required by Federal Reserve requirements depending upon initial date of participation, non-taxable funds, international funds, and the like, all as alluded to above. Thus, for example, test 53 distinguishes between an old standard fund and a clone (new fund), generating appropriate reports to the fund custodian(s) (functional blocks 55 and 57). Finally, the short term investment transactions are reported to the account data processing 60 to update each subscriber's account data file; are employed to update the subscriber's master file (61); and are used to update the customer's local data base (step 62) as in his local brokerage office.

That completes the data processing in overview for one complete operation of the system, as for a daily iteration. The next following day, the system will re-execute the functional operations of FIG. 1 employing the new set of operands generated during the day following the previous ixeration in the manner above discussed.

Figure 2:
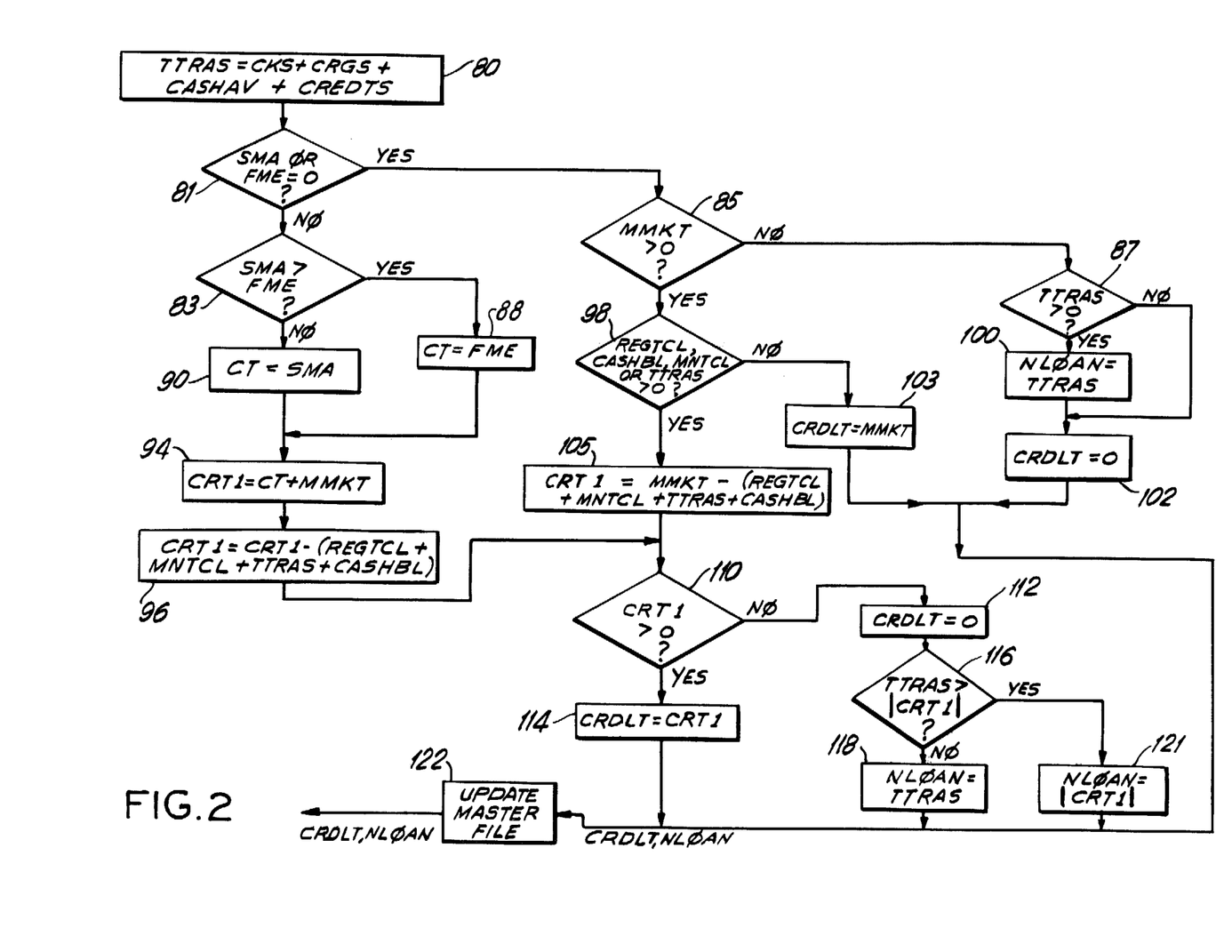
FIG. 2 is a flow chart depicting data processing for the credit limit updating and overdraft functional blocks 26, 31 and 33 of the FIG. 1 overall data processing disclosure.

Referring now to FIG. 2, there is shown a detaile; flow chart for credit limit updating and overdraft processing corresponding to functional blocks 26, 31 and 33 of composite FIG. 1. It is again the overall purpose of the FIG. 2 flow chart to generate the credit limit variable CRDLT for each of the i system customers to reflect the remaining loanable worth of that customer's assets. For purposes of FIG. 2 processing, the following variables (again, all indexed by subscriber but shown without index which remains understood) are employed:

| Input Variables | |
|---|---|
| SMA | Special and miscellaneous value of the customer's account, reflecting the customer's borrowing power based on the securities he holds in his brokerage account. This is measured as the then obtaining percentage of the value of the customer's brokerage assets as established by Regulation T of the Federal Reserve Board. The presently obtaining value, for example, is 50% for common stocks. |
| FME | Firm maintenance excess of the customer's account representing the customer's borrowing power based upon the brokerage house definition of the loan value of the customer's securities. A typical presently obtaining value might be 70% of the security valuation. |
| MMKT | The value of the customer's regular money market fund account. |
| CKS, CRGS, CASHAV, CREDT | The value of the checks, charges, cash advances, and credits respectively, reported by the bank for the interval since the previous processing. |
| REGTCL | Represents the amount of any Regulation T call against the account. |
| MNTCL | The amounts of any mainentance call against the account. |
| CASHBL | This variable represents the cash required for transactions in the customer's securities cash account. |
| Output Variables | |
| CRDLT | As above discussed, this is the credit limit remaining to the customer following all processed transactions. |
| NL$\phi$AN | The new or additional loan increment required for any customer overdraft |

With the above variable definitions in mind, attention will now be directed to the processing of FIG. 2. As a first matter, the value of "today's transactions" (a computational variable TTRAS), i.e., the value of all transactions for the customer for the subject processing day, is computed as the algebraic sum of the checks (CKS), charges (CRGS), cash advances (CASHAV) and credits (CREDTS). A didactic fortran-type statement is $$TTRAS = CKS + CRGS + CASHAV + CREDTS \qquad (1)$$

Test 81 first determines whether either of the special and miscellaneous or firm maintenance excess values for the subscriber (SMA or FME variables) is equal to zero which would indicate that no customer borrowing power remains in the subscriber's brokerage account, applying the more rigorous of the two standards. Assuming test 81 fails ("NO" branch) thus signalling that the customer does have remaining borrowing power, test 83 determines whether the Federal Reserve (SMA) or brokerage firm internal (FME) standard is the more stringent and, depending upon the outcome, sets a computational intermediate credit variable CT equal to the lesser of the SMA or FME stored values (steps 88 and 90). A further computational credit limit variable CRT1 is then set equal to the sum of the CT variable (lesser of FME or SMA) plus the sum of the customer's money market amount (MMKT), $$CRT1 = CT + MMKT \qquad (2)$$

(functional block 92).

The processing variable CRT1 is updated (block 96) to be decremented for amounts due in the account for Federal Reserve Regulation T calls (REGTCL), maintenance calls (MNTCL), the amounts expended in the day's transactions (TTRAS) and the cash balance (CASHBL) due for cash account processing.

$$CRT1 = CRT1 - [REGTCL + MNTCL + TTRAS + CASHBL] \qquad (3)$$

The variable CRT1 following processing 96 represents a provisional credit limit for the subscriber subject to further processing below discussed.

The above described functioning followed when test 81 noted positive lendable proceeds remaining in the subscriber's brokerage account ("NO" output of test 81). Assuming there to be no such lendable amount—i.e., where the subscriber has no marginal securities or where they are already fully margined ("YES" output of test 81), test 85 then determines whether customer money market (MMKT) value is greater than zero, i.e., that the customer has a long money market position although he has no marginable securities. Assuming this to be the case, test 98 determines whether funds are required of the account to satisfy Regulation T calls, expenditure transactions or the like. If so ("YES" output of test 98), the provisional computation variable for the customer CRT1 is set equal to his money market balance less the amount needed to satisfy fund requirements in a manner analogous to that given above with respect to statement (3), as by, $$CRT1 = MMKT - [REGTCL + MNTCL + TTRAS + CASHBL] \quad (4)$$

(functional block 105).

The provisional credit variable CRT1 as defined at the output of functional block 96 or 105 is supplied to test 110 to assure that the provisional variable CRT1 is positive. If it is ("YES" output of test 110), the customer credit limit variable CRDLT is set equal to CRT1 (114) thus completing execution of the FIG. 2 processing. If the provisional credit variable CRT1 is not greater than zero ("NO" output of test 110)—as by debit transactions exceeding the money market and borrowing power of the customer's securities, the credit limit variable for the customer is set equal to zero (block 112). Functional block 116 next determines whether or not the customer's transactions TTRAS exceed the absolute value of the provisional credit limit CRT1 and functional blocks 118 and 121 generate a new loan amount NLOAN as the lesser in absolute value of the transactions (118) or provisional credit limit (121). This, again, completes processing for the customer with zero value in CRDLT, an appropriate new loan amount NLOAN being generated.

Continuing with respect to FIG. 2 processing, if the customer has no borrowing power in his securities account ("YES" output of test 81) and has no money market value ("NO" output of test 85), and if he has generated transactions (TTRAS) by using his charge card or checks notwithstanding the absence of anything to support such transactions ("YES" output of test 87), a new loan is established equal to his transactions (step 100), his credit limit is set equal to zero (102), and an exit is made from FIG. 2 processing. As a final mode of FIG. 2 processing, if the customer has a positive money market balance ("YES" exit from test 85), and has no current cash requirements ("NO" output of test 98), his credit limit is set equal to his money market balance (functional block 103) and exit is made from FIG. 2 processing.

Thus, the above described operation of the FIG. 2 credit limit and overdraft processing (functional blocks 26, 31 and 33 in FIG. 1) computes the credit limit CRDLT(I) for each of the system's customers, i.e., the amount remaining to that customer for use by his charge card, checks and cash advances. Also computed by such processing is the incremented loan value NLOAN(I) to be added to the customer's overdraft.

Figure 3:
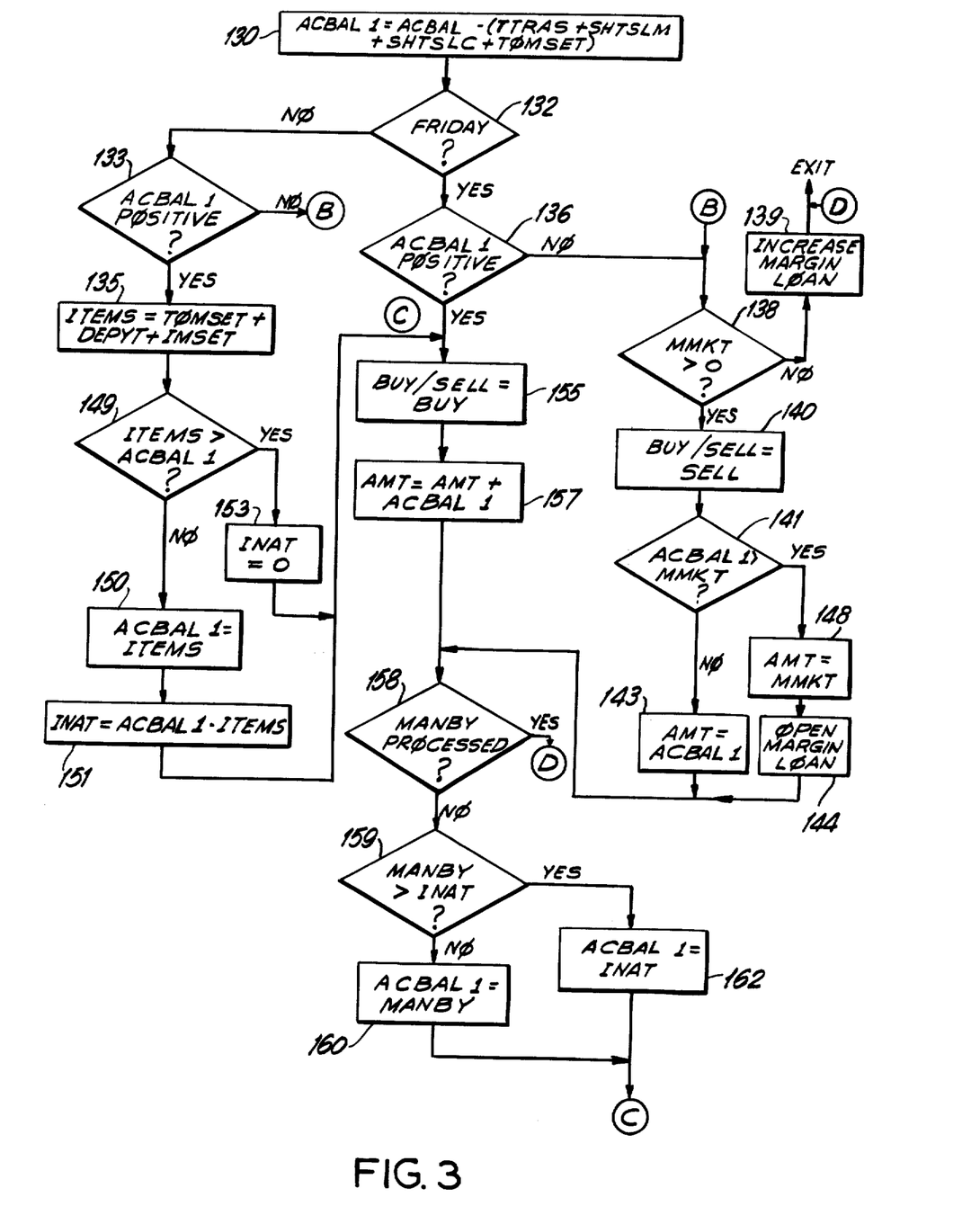
FIG. 3 is a flow chart illustrating updating a short term investment (e.g., money market) account functional block 45 of FIG. 1.

Referring now to FIG. 3 there is shown a detailed flow chart which executes the updated money market position functioning operation 45 of FIG. 1, i.e., determines whether or not short term investments should be increased or decreased and, if so, by what total amount. Such processing involves as variables:

Input Variables

| | |
|---|---|
| ACBAL | The available free cash balance of the customer's brokerage account for such as dividends, interest, deposits and so forth. |
| TØMSET | The amount of securities trades settling the next business day. |
| DEPYT | The customer's deposits during the period, assumed to be one day, being processed. |
| IMSTL | Immediate securities settlement items (for example, security redemptions). |
| CKS, CRGS, CASHAV, CRDTS | The value of the checks, charges, cash advances, and credits respectively, reported by the bank for the interval since the previous processing. |
| MANBY | The amount of manually entered money market buys. |
| SHTSLM | Short sales in the customer's margin account. |
| SHTSLC | Short sales in the cash account against securities held by a customer and overdue. |
| Output Variables | |
| BUY/SL | Decision to buy or to sell short term investments. |
| AMT | Amount of short term position to be bought or sold. |

Again, it will be appreciated that each of the above variables is actually indexed to reflect each such quantity for each customer. The indexing variable (I) has been deleted for convenience.

Referring now to the flow chart of FIG. 3, as a first matter, a processing net present account balance variable ACBAL1 is computed to be the cash balance ACBAL, less funds required to pay for the customer's use of his charge card, checks and the like (TTRAS), or to pay amounts due in his brokerage account which are either overdue or which will be settling during the next day (TOMSET), as by $$ACBAL1 = ACBAL - (TTRAS + SHTSLM + SHTSLC + TOMSET) \quad (5)$$

(block 130). In FIG. 3, it is assumed that money market purchases will occur only once per week, as on a Friday—and functional block 132 determines whether or not the particular iteration of FIG. 3 processing is taking place at the predetermined, e.g., Friday time. If it is ("YES" output of test 132) and if test 136 confirms that the provisional variable ACBAL1 is positive ("YES" output), processing enters a BUY subroutine. Accordingly, the buy/sell distinguishing output variable BUY/SELL is set to a buy condition (e.g., by loading the variable BUY/SELL with a positive integer—functional block 155), and the amount of short term investment AMT variable is loaded with the provisional sum ACBAL1 (step 157).

Correspondingly, if test 136 provides a "NO" output signalling that the subscriber charges exceed the surplus funds in his securities account, the data processing enters a SELL subroutine to sell sufficient money market shares to obviate the difference or cash requirement (assuming such shares to exist). Test 138 determines whether or not the customer has money market shares (i.e., whether MMKT exceeds zero). If he does not, his margin loan is increased (139) and FIG. 3 processing exits. Assuming the subscriber does have a positive money market (MMKT) balance, step 140 sets the buy/sell BUY/SELL variable to the sell condition (e.g., a stored negative integer). Test 141 then determines whether the account balance provisional variable ACBAL1 exceeds the money market (MMKT) position and, depending upon the results of the test, the amount (AMT) variable of money market funds to be sold is set to the lesser of the money market MMKT (step 145) or ACBAL1 variable (step 143) as appropriate. If all his money market shares are sold (145), the difference between what the customer needs and his MMKT amount opens a margin loan transaction (144).

Turning now to the alternate or "NO" branch of test 132 (which presumes that the current iteration of processing is not the money market buy/sell assumed Friday date), test 133 first determines whether the net account balance ACBAL1 which reflects subscriber expenditures is positive. If it is not, the "NO" exit of test 133 enters the SELL subroutine above discussed to sell either all the money market shares or a lesser amount if that will suffice to cover the subscriber's expenditures and securities requirements. Assuming ACBAL1 is positive, indicating an excess of cash over requirements in a customer account ("YES" exit of test 133), functional block 135 computes a computational variable ITEMS which is the sum of variables representing yesterday's deposits (DEPYT), securities sales settling tomorrow (TOMSET), and immediate settlement items such as redemptions (IMSET) as by $$\text{ITEMS} = \text{DEPYT} + \text{TOMSET} + \text{IMSET} \qquad (6)$$

It is desired that the subject proceeds reflected in ITEMS be invested in money market funds immediately and not await the next investment (assumed Friday) date. If such items ITEMS exceed ACBAL1 (test 149) provides a "YES" output; a processing variable INAT is set equal to zero (step 153) and processing enters the BUY subroutine to purchase the requisite money market shares by setting the BUY/SELL variable to the buy condition (155) and loading the AMT variable with the ACBAL1 value. If the immediately investable ITEMS amounts are less than ACBAL1, ACBAL1 is set equal to ITEMS (step 150), the computational variable INAT is set equal to the difference between the processing variables ACBAL1 and ITEMS by $$\text{INAT} = \text{ACBAL1} - \text{ITEMS} \qquad (7)$$

and the BUY subroutine is entered as above discussed. The foregoing processing is required since two ITEMS constituents DEPYT and IMSET are inherently reflected in ACBAL and therefore in ACBAL1 and must not be twice counted.

Finally, functional blocks 158, 159, 160 and 162 accommodate manually entered buy commands. If there is an unprocessed manual buy command as sensed by test 158, test 159 sets the purchase variable ACBAL1 equal to the lesser of INAT (162) or the manual buy (MANBY) (160) and the BUY loop is entered to purchase the appropriate amount (AMT). Once this is done, the next iteration through test 158 will reflect that the manual buy has been processed, at which point the composite processing of FIG. 3 is completed and the "YES" exit of test 158 passes to the exit of FIG. 3.

The above described composite arrangement has thus been shown to provide an improved securities brokerage/cash management system which supervises and integrates a brokerage account, a charge card, checking, and one or more short term investments, providing great flexibility for the account subscriber, while providing him with earned income for funds not invested or required to satisfy expenditures.

The above described arrangement is merely illustrative of the principles of the present invention. Numerous modifications and adaptations thereof will be readily apparent to those skilled in the art without departing from the spirit and scope of the present invention.

What is claimed is:

1. In combination in a system for processing and supervising a plurality of composite subscriber accounts each comprising a margin brokerage account, a charge card and checks administered by a first institution, and participation in at least one short term investment, administered by a second institution, said system including brokerage account data file means for storing current information characterizing each subscriber margin brokerage account of the second institution, manual entry means for entering short term investment orders in the second institution, data receiving and verifying means for receiving and verifying charge card and check transactions from said first institution and short term investment orders from said manual entry means, means responsive to said brokerage account data file means and said data receiving and verifying means for generating an updated credit limit for each account, short term investment updating means responsive to said brokerage account data file means and said data receiving and verifying means for selectively generating short term investment transactions as required to generate and invest proceeds for subscribers' accounts, wherein said system includes plural such short term investments, said system further comprising means responsive to said short term updating means for allocating said short term investment transactions among said plural short term investments, communicating means to communicate said updated credit limit for each account to said first institution.

2. In combination in a system for processing and supervising a plurality of composite subscriber accounts each comprising a margin brokerage account, a charge card and checks administered by a first institution, and participation in at least one short term investment, said system including brokerage account data file means for storing current information characterizing each subscriber margin brokerage account, manual entry means for entering short term investment orders, data receiving and verifying means for receiving and verifying charge card and check transactions from said first institution and short term investment orders from said manual entry means, means responsive to said brokerage account data file means and said data receiving and verifying means for generating an updated credit limit for each account, short term investment updating means responsive to said brokerage account data file means and said data receiving and verifying means for selectively generating short term investment transactions as required to generate and invest proceeds for subscribers' accounts, said system further comprising means for generating a stored record of each subscriber deposit, charge card and check transactions, and anti-kiting means for providing an output alert record responsive to either of said deposits, or the check or charge card expenditures exceeding predetermined maximum bounds in amount and frequency, communicating means to communicate said updated credit limit for each account to said first institution.

3. A combination as in claim 1 or 2 wherein said updated credit limit generating means comprises means for accumulating the amount of charge card usage and checks for each subscriber, means responsive to said brokerage account data file means for generating a subscriber updated credit limit measured by the difference between the limiting residual subscriber brokerage account securities loan value augmented by the value of the subscriber's short term investment, decremented by the value of the subscriber's aggregate expenditures and funds required for brokerage account purposes, means for reporting siid updated credit limit to said brokerage account data file means.

4. A combination as in claim 3 further comprising means for generating a subscriber loan record when the subscriber's aggregated expenditures exceed the value of the short term investments and securities loan value as reported by said brokerage account data file means, and by said updated credit limit.

5. A combination as in claim 4 further comprising cross reference file means connected to said receiving and verifying means for assuring that received transactions are for customers having an entry in said cross reference file means.

6. A combination as in claim 5 wherein said short term transaction generating means comprises short term investment account buying and selling means, means for computing the difference between the brokerage account cash balance of said brokerage account data file and fund requirements representing the sum of the account expenditures and funds required for brokerage account and settlement purposes, and means for activating either said short term investment buying or selling means depending upon whether said account balance difference computing means senses a positive or negative difference.

* * * * *